Feb. 6, 1951 C. O. VALLAS 2,540,919
PORTABLE DUST COLLECTOR AND SEPERATOR
Filed Jan. 25, 1949 2 Sheets-Sheet 1
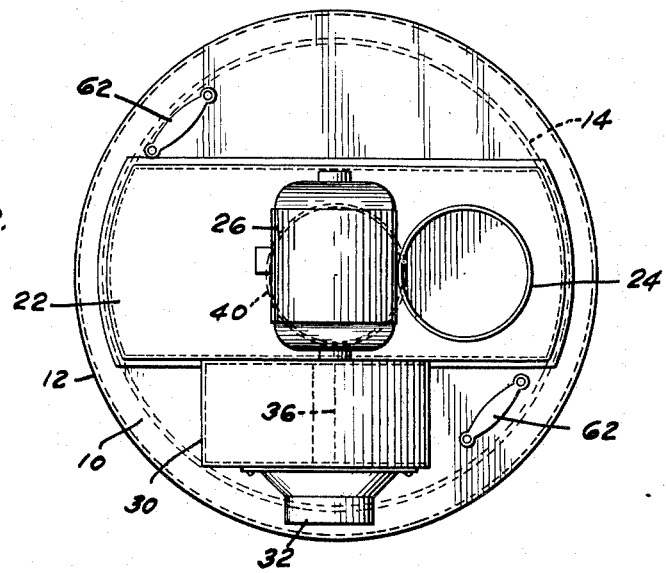
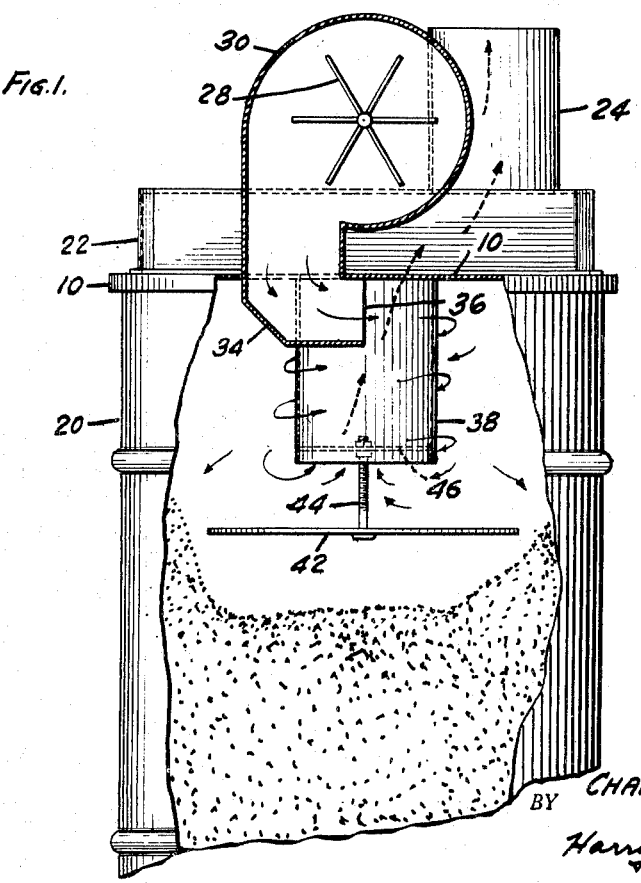
INVENTOR.
CHARLES O. VALLAS
BY Harry H. Hitzeman
ATTORNEY.

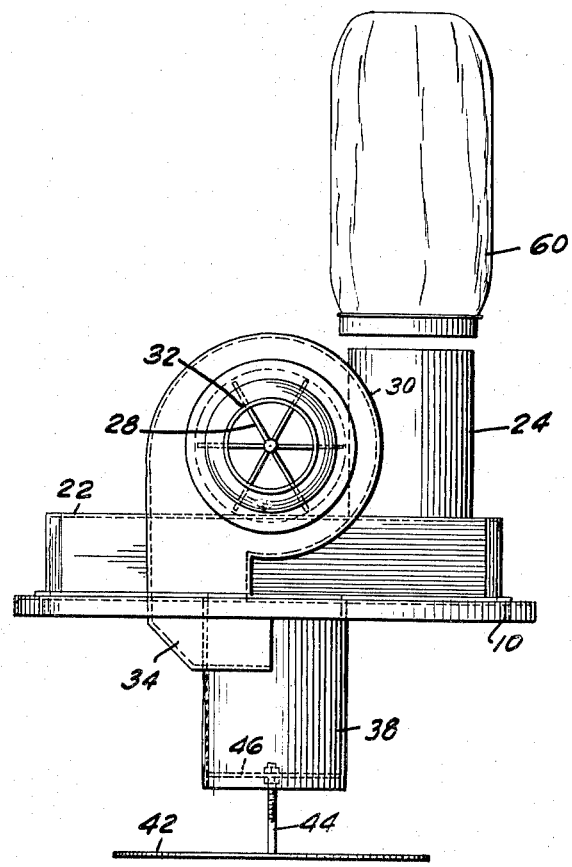
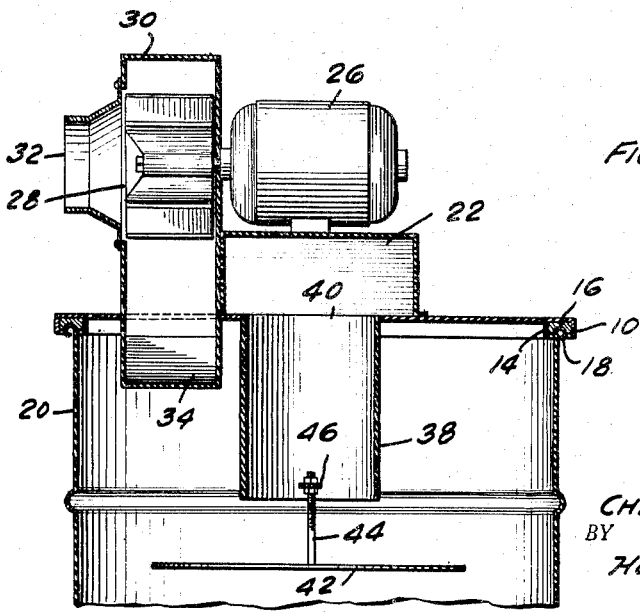

Patented Feb. 6, 1951

2,540,919

UNITED STATES PATENT OFFICE 2,540,919

PORTABLE DUST COLLECTOR AND SEPARATOR

Charles O. Vallas, Chicago, Ill., assignor to Wm. H. Vallas, Jr., and Sons, a copartnership Application January 25, 1949, Serial No. 72,730

2 Claims. (Cl. 183—36)

My invention relates to improvements in dust collectors or separators and to similar devices.

My invention relates more particularly to a device of the type described which is portable and capable of easy and simple installation in pattern shops, small manufacturing plants and other places where the requirements for dust removal are not so imperative that a permanent and complete dust collecting system is necessary or required.

There are a large number of pattern shops, small woodworking shops and similar places throughout the country where band or disc saws or other equipment are operated only at intervals throughout the day or where the equipment produces only a small amount of dust or sediment. These shops do not require an elaborate dust collecting and disposal equipment or systems and it is especially for such conditions that the present invention has been provided.

The principal object of the present invention is to provide a dust collector and separator which is a self-contained unit capable of easy installation or removal.

A further object is to provide a dust collector and separator capable of being positioned in operating condition on a barrel or drum which may become the storage container for the dust or sediment collected.

A further object is to provide a device of the type described which is complete as a unit mounted upon a base or frame capable of being set upon an open-topped container and the device is ready for operation.

A further object of the invention is to provide a device of the type described that is cheap to manufacture and assemble, capable of easy manipulation by a single person and one which will not easily become broken or out of order.

Other objects and advantages will be more apparent from the following description wherein reference is had to the accompanying drawings upon which Figure 1 is a side elevational view of my improved dust collector and separator shown in operative position upon a cylindrical drum or container, the parts broken away in sections to more clearly show other parts;

Figure 2 is a plan view thereof;

Figure 3 is a vertical sectional view through the unit; and

Figure 4 is a front elevational view of the self-contained unit shown separated from the dust container.

In the embodiment of the invention which I have chosen to illustrate and describe, the dust collector and separator unit may include a cylindrical base plate 10 which has a downwardly turned outer edge 12 and a cylindrical ring 14 concentric therewith and spaced inwardly therefrom. I provide a gasket 16 positioned between the edge 12 and the ring 14 which is preferably made of sponge rubber or similar material to provide an air tight seal with the rolled over edge 18 of a cylindrical drum 20 whenever the unit is placed in operative position.

I provide an elongated hollow housing 22 suitably fastened upon the top of the base plate 10 with a cylindrical outlet pipe member 24 extending upwardly therefrom at one end of the same. A motor 26 is mounted upon the housing 22 in direct driving connection with a multiple bladed fan 28 which is located in a circular fan housing 30 that has a side inlet passageway 32 connected therewith. The housing 32 may continue downwardly through a suitable opening in the base plate 10 and from a conduit 34 which makes a turn and is directed in a horizontal plane directly below the plate 10. The conduit terminates in an opening 36. I position a tubular conduit 38 having an opening 40 communicating with the housing 22 directly below the base plate 10, the lower end of the tubular conduit extending a desired distance into the drum 20. I position a guard in the form of a disc 42 a desired distance below the opening lower end of the tubular conduit 38, the disc being mounted upon a bolt member 44 positioned for adjustment on a cross brace 46 in the lower end of the tubular conduit 38.

The device operates as follows: When it is desired to pick up saw dust or other sediment or dust from a machine that is creating the same, a conduit may be connected to the inlet passageway 32 of the fan housing 30. The motor driven fan 28 will suck in the saw dust or other sediment and air and direct the same downwardly through the conduit 34 in a circular motion about the tubular conduit 38. Since saw dust and other sediment is heavier than air, it will naturally fall to the sides and tend to drop to the bottom of the barrel passing around the edges of the disc-like shell or guard member 42. The sediment which is in the air will thus drop below the guard 42 and the cleaned air will be directed outwardly as shown by the arrows through the tubular conduit 38 into the housing 22. From the housing 22 the air may be blown through the outlet conduit 24 either back into the atmosphere or, if desired, a suitable conduit may be connected between the member 24 and the exterior of the building.

Where the conditions warrant, I have found that a bag member 60 similar to that provided for vacuum cleaners may be attached to the discharge tube 24. The guard 42 has been adjustably mounted, so that under certain conditions it may be raised or lowered to provide more or less space between the edge of the same and the opening through the circular conduit 38.

From the foregoing description it can be seen that I have provided a comparatively simple dust collector and separator unit which is comparatively light in weight and thus can be moved from one barrel to another when the barrels become filled with sediment. It can also be seen that for small factories and pattern shops where only one or two machines are producing wood, dust or other sediment, a cheap and efficient dust collecting and separating mechanism is provided, one which can be easily handled by a single individual to place in operating machine or to remove. Handles 62 are provided on the base plate 10 so that the entire unit can be lifted and carried about when desired.

While I have illustrated and described a specific embodiment of the invention, it will be apparent to those skilled in the art that changes and modifications may be made in the exact details shown and I do not wish to be limited in any particular; rather what I desire to secure and protect by Letters Patent of the United States is:

I claim:

1. A dust collector and separator comprising a flat cylindrical base member having a downwardly turned edge flange and capable of being telescoped over an open-topped container, an elongated housing mounted on the top of said base member, an outlet pipe extending upwardly therefrom at one end of said housing, a motor mounted on said housing, a fan housing positioned adjacent said first named housing, a multibladed fan therein driven by said motor, a conduit extending downwardly from said fan housing through said base member and sideways under said base member, a downwardly directed tubular conduit mounted on the bottom of said base member and in communication with said elongated housing whereby dust-filled air may be drawn through said fan housing and directed downwardly into said container in a circular stream around said tubular conduit and out through said tubular conduit, elongated housing, and the outlet pipe therefrom.

2. A dust collector and separator comprising a flat cylindrical base member having a downwardly turned edge flange and capable of being telescoped over an open-topped container, an elongated housing mounted on the top of said base member, an outlet pipe extending upwardly therefrom at one end of said housing, a motor mounted on said housing, a fan housing positioned adjacent said first named housing, a multibladed fan therein driven by said motor, a conduit extending downwardly from said fan housing through said base member and sideways under said base member, a downwardly directed tubular conduit mounted on the bottom of said base member and in communication with said elongated housing whereby dust-filled air may be drawn through said fan housing and directed downwardly into said container in a circular stream around said tubular conduit and out through said tubular conduit, elongated housing, and the outlet pipe therefrom, said tubular conduit having an adjustably mounted disc-shaped guard positioned therebelow.

CHARLES O. VALLAS.

REFERENCES CITED

The following references are of record in the file of this patent:

UNITED STATES PATENTS

| Number | Name | Date |
| --- | --- | --- |
| 1,235,174 | Williams | July 31, 1917 |
| 1,478,424 | Cross | Dec. 25, 1923 |
| 1,868,519 | Breuer | July 26, 1932 |
| 1,870,947 | Drumgold | Aug. 9, 1932 |
| 2,013,498 | McConaughy | Sept. 3, 1935 |

FOREIGN PATENTS

| Number | Country | Date |
| --- | --- | --- |
| 191,835 | Switzerland | Dec. 1, 1937 |